3,523,051
Patented Aug. 4, 1970

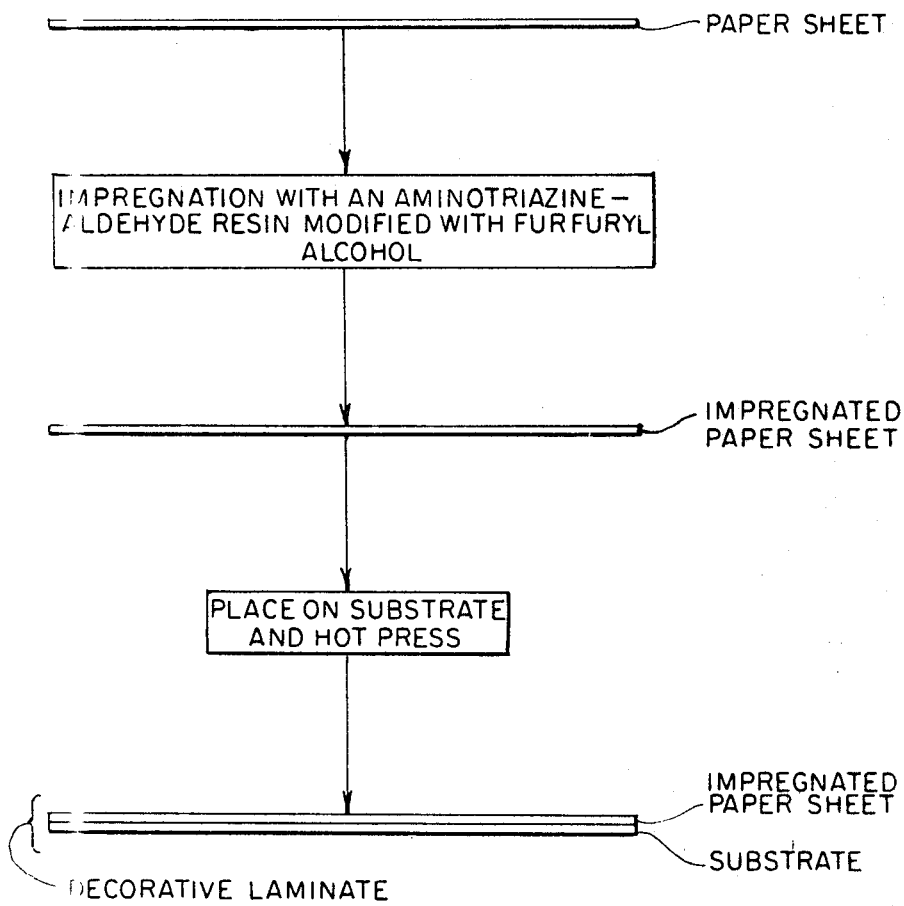

3,523,051
METHOD OF MANUFACTURING DECORATIVE BOARDS BY USE OF THERMOSETTING RESINS
Wakichiro Yasutake, Aichi-ken, Japan, assignor to Shouei Chemical Products Co., Ltd., Aichi-ken, Japan
Filed Aug. 17, 1966, Ser. No. 572,892
Claims priority, application Japan, Nov. 11, 1965, 40/69,350; Mar. 19, 1966, 41/17,087
Int. Cl. C09j 5/06
U.S. Cl. 156—331
5 Claims

ABSTRACT OF THE DISCLOSURE

A thermosetting resin comprising an aminotriazine-aldehyde resin modified with furfuryl alcohol and containing a latent curing agent is used at a pH of 7–11 to impregnate one or more sheets of paper, the impregnated paper or papers being pressed against a substrate at a temperature of 100° to 200° C. and a pressure of 5 to 20 kg./cm.$^2$ to form a decorative laminate.

---

This invention relates to the manufacture of decorative boards by impregnation of cellulosic material sheets with a mixture of triazine-aldehyde condensate and furfuryl alcohol and overlaying the impregnated material sheets onto a substrate with the application of heat and pressure.

In order to eliminate the defects and improve the properties of aminotriazine resins, it has in recent years been proposed to mix, as modifiers, sulfamates, aromatic sulfonamides, amino compounds such as polyalkylene polyamines, alkylesters of methacrylic acid, epoxy resins, polyvinyl alcohol, polyhydric alcohol, polysaccharides, etc. with the condensates of aldehydes and melamines or guanamines or with their cocondensates. It has been found by the inventor that furfuryl alcohol compounded with resins as a modifier can provide the resins with very good internal plasticity, mold releasability, and permeability. Triazines which may be used in the invention are melamines, melamine derivatives, and guanamines. The melamine derivatives include derivatives such as 2,4,6-triethyltriamino-1,3,5-triazine, and ammeline, ammelide, etc. The guanamines include formoguanamine, acetoguanamine, and benzoguanamine. The aldehydes include formaldehyde, acetaldehyde, and benzaldehyde. This invention has enabled densely sized paper which has not been used in the conventional process for the manufacture of decorative sheets to be easily impregnated with resin and has made it possible with great ease to produce novel and high grade decorative boards not only by using unsized paper as well without spoiling advantageous characteristics thereof.

It has been the usual practice in the manufacture of decorative boards to impregnate three kinds of unsized papers usually called overlay paper (or facing paper), pattern paper (or dressing paper), and core paper (or base paper), respectively, with melamine resin, dry the impregnated papers, shape them at a high temperature and high pressure, and then cool them to obtain a laminate, or to impregnate the overlay paper, pattern paper, and core paper with larger amounts of resin, press them against a wooden cellulosic substrate such as plywood with low pressure and high heat and then cool the resulting product to obtain a decorative laminated wood board. In order that the products can faithfully display the original beauty of face sheets and can have long life, those conventional methods call for paper rendered with contradictory properties, i.e. high water absorption and oil impregnation and great wet strength, and also for high grade colorless resin having excellent transparency. However, no paper or resin has hitherto been available which is satisfactory in properties for the easy manufacture of such delicately printed decorative laminates, decorative plywoods, or high class overlaid plywoods with natural wood patterns are obtainable by the method of the present application, under an extensive variety of combined conditions without any cooling step.

As regards the paper quality for use in the process of this invention, it must be noted that the advancement of paper-making techniques and of resin impregnation technique has made it practicable to make and impregnate even unsized paper for facing use weighing as light as 25 g./m.$^2$, whereas it had been customary till recently to use unsized paper weighing as heavy as 45 g./m.$^2$ for the same purpose. Nevertheless, either of such paper is not suitable for the manufacture of decorative laminates or decorative plywoods at low temperature and low pressure as by the present invention because they are intended for use in so-called high-temperature high-pressure forming into conventional decorative laminates and do not possess sufficient resin impregnation property and wet strength to maintain therein the desired resin content. Although there are some among thin paper sheets for industrial use which weight about 13 g./m.$^2$ and are suitable for the purpose of the invention, they lack sufficient strength to permit uniform impregnation thereof with a desired amount of desired resin according to the invention. If, however, the paper sheets of the weight above mentioned are given great wet strength by the use of a sizing agent such as urea resin, melamine resin, or dialdehyde starch as those used in the process of the invention, they can be freely and uniformly impregnated through very complicated resin impregnation process with any desired amount of any desired resin. The manufacture of decorative laminates having unprecedentedly unique printed patterns on their surface has been made possible by the use of such resin according to this invention in the impregnation of printed pattern sheets of conventional type, printed pattern sheets prepared by calendering or super calendering starting blank sheets and then printing them on the surface, or sized paper sheets of good printability which are originally made as such and then printed on the surface. As for core paper, the invention also permits impregnation of strongly sized kraft paper such as one for industrial wrapping use. This improves the properties of decorative laminated boards in which chipboards, plywoods and other wooden substrates are employed, with particular effects on filling and prevention of cracking.

Characteristic features of resins used in the process of the invention may be described as follows. Furfuryl alcohol is highly reactive and it is resinified and discolored on contacting with acidic substances or with oxygen in the air, even at low temperatures. This reaction can be prevented and the compound can be stabilized by the coexistence of an organic or inorganic base. Moreover, it has very great permeability and ready solubility in water, alcohols, ethers, etc. Thus the use of furfuryl alcohol as a solvent can provide the modified resin according to this invention with superior permeability to the above papers for lamination or overlaying.

In general, aminotriazine resins are stabilized at pH 8–10 in the presence of a base. If an aminotriazine resin in such stabilized condition is blended with the alcohol, both can be modified while in stabilized condition. The pH of this resinous solution may be adjusted to the range between pH 7 and 11 by addition of a latent curing agent with a pH value of nearly 7. A salt obtained by the reaction of an organic amine with an acid may be used as the latent curing agent. Samples of the organic amines are: alkylamines such as monomethylamine, dimethylamine, trimethylamine, monoethylamine, triethylamine, monopropylamine, dipropylamine, tripropylamine and the like; polyalkylenepolyamines such as ethylenediamine, diethylenetriamine, triethylenetetramine, tetraethylenepentamine and the like; alkanolamines such as monoethanolamine, diethanolamine, triethanolamine and the like; and 2-amino-2-methyl-1-propanol, 2-amino-2-ethyl-1-propanol, 2-amino-2-propyl-1-propanol and the like. Samples of the acids are: hydrochloric acid, nitric acid, sulfuric acid, phosphoric acid and the like. Salts prepared from these amines and acids may be used singly or jointly. The modified resin thus prepared in accordance with the invention is not resinified or discolored, and is usable as a transparent, highly permeable resinous solution in the making of decorative laminates or boards. If the pH value is lowered by the action of the hardening agent in the course of pressing with heat and pressure, cocondensation polymerization with the aminotriazine resin will occur and most of the alcohol will be resinified. While poly-condensation of the alcohol alone will give a black tarry furan resin, the resin subjected to cocondensation polymerization according to the invention will occur as a slightly yellowish white, transparent elastic resin. Of organic solvents heretofore employed as penetrants for amino resins, very few are known to be comparable to furfuryl alcohol which are effective not merely as a solvent but also in improving the permeability and reactivity of the amino resins. With a blended percentage of nearly 20%, the alcohol exhibits a sharp increase in permeability. Further, because the alcohol has a higher boiling point than those of other solvents, it seldom bubbles in the course of hardening by reaction of the resin. Accordingly, impregnated paper for facing use can be made into a glassy transparent film, and hence it can give a very fine face of a decorative laminate or board. Impregnated paper for pattern sheet and core paper can also be obtained in the form of finely finished film. The properties of the modified resin begin to be improved with addition of about 15% of the alcohol but will be deteriorated when the addition exceeds 50%. Since the addition of the alcohol to the resin can enhance the properties of aminotriazine resin and give additional properties of alkali resistance, crack resistance, non-adhesion to metals, and the like, it is made possible, as will be clear from the foregoing description, to manufacture decorative laminates or boards using new sized paper as well as non-sized paper under conditions of temperature in the range of 100–200° C. and pressure of 5–20 kg./cm.$^2$, with omission of any cooling step.

The accompanying drawing is a schematic illustration of the method of the invention.

The present invention is illustrated by the following examples.

EXAMPLE 1

Fifty parts of melamine-formalin resin having a resin content of 50% were blended with 50 parts of furfuryl alcohol. With the addition of 2% latent curing agent, the pH of the modified resin thus obtained was adjusted to 8.0. A thin sheet weighing 15 g./m.$^2$ and having a wet strength of 0.25 kg. was impregnated several times with portions of the modified resin, and dried at about 100° C., when a transparent and homogeneous overlaid impregnated paper having a total applied resin content of 80° was obtained. This impregnated sheet was pressed against the surface of a plywood and the sheet and plywood were shaped into one piece under conditions of a temperature of 100–110° C., pressure of 10–12 kg./cm.$^2$, and time of 13 minutes, without the step of cooling. A decorative plywood overlaid with a pattern sheet of a natural wood, thus resulted. The properties of the overlaid plywood thus obtained were as tabled hereunder.

Under identical conditions a similar decorative plywood was made with an unmodified resin, but the resin permeability, crack resistance, and mold releasability were unsatisfactory and any decorative plywood having a merchandise value was hardly obtained.

PROPERTIES OF DECORATIVE LAMINATED BOARD OF NATURAL WOOD OVERLAID WITH DECORATIVE SHEET

| Property | Testing method | | Result |
|---|---|---|---|
| Abrasion resistance | NEMA LP 2-2-01, Tober abrasion tester | Abr. value | 100–150 revlns. |
| | | Abr. amount | 70–80 mg./100 r. |
| Resistance to hot water | NEMA LP 2-2-02 | | No irregularity. |
| Thermal resistance | NEMA LP 2-2-03 | | Do. |
| Resistance to cigarette | NEMA LP 2-2-04, Cigarettee tester | | No irregularity on resin surface. |
| Resistance to contamination | NEMA LP 2-2-05 | Reagents # 1–20 | No irregularity. |
| | | Reagents # 21–29 | Do. |
| Crack resistance | Allowed to stand in thermostatic chamber at 70° C. for 48 hrs | | Do. |
| Light resistance | NEMA LP 2-2-06, Fade tester | | Do. |

EXAMPLE 2

Eighty parts of benzoguanamine-formalin resin having a resin content of 50% were blended with 20 parts of furfuryl alcohol. The pH of the modified resin was adjusted to 7.5 with addition of 3% latent curing agent. With this resin a sheet, which was otherwise to be commonly impregnated with polyester resin, weighing 80 g./m.$^2$ smoothened on the surface by calendering and subsequently printed as a pattern sheet was impregnated and dried at about 100° C., when a uniformly impregnated pattern sheet having an applied resin content of 55 to 60% resulted. This impregnated paper was pressed against a chipboard at a temperature of 130° C. and a pressure of 20 kg./cm.$^2$ for 15 minutes and without any cooling step to obtain a printed decorative chipboard. Except for the abrasion value, the product had almost the same properties as the one obtained in the preceding example. Under identical conditions a decorative chipboard of the same print pattern as above was formed with unmodified resin. Like the counterpart in Example 1, the use of the unmodified resin presented great difficulty in forming a commercially valuable decorative board.

EXAMPLE 3

Sixty parts of acetoguanamine-melamine-formalin resin having a resin content of 55% were blended with 40 parts of furfuryl alcohol. After adjustment of the pH to 8.0 with addition of 1.5% latent curing agent, a modified melamine resin was prepared. Printed pattern sheet made by printing a pattern on a new sized paper for printing use, weighing 60 g./m.$^2$, and sized kraft paper, weighing 60 g./m.$^2$, were both impregnated with the resin so as to have resin contents of 45–50% and 50–55%, respectively. Separately, a surface overlaying impregnated thin paper, weighing 13 g./m.$^2$ and having a wet strength of 0.2 kg., was formed in the same manner as described in Example 1. Next, the overlaying impregnated sheet, printed and impregnated pattern paper, and impregnated kraft paper were placed in the order mentioned, from the top downward, on a plywood substrate. They were pressed and formed into a unitary decorative plywood with heat at 130° C. and pressure at 15 kg./cm.$^2$ for 15 minutes, without cooling. The product showed good results in tests run according to the NEMA standard testing methods. An unmodified resin, by contrast, did not give even usable impregnated paper.

EXAMPLE 4

Impregnated overlay paper was prepared in the same way as in Example 1. Conventional pattern sheet, which was originally intended for being impregnated with polyester resin, was impregnated with the same modified resin as that used in Example 3 and sized kraft paper as referred to in Example 3 was used as core paper. The impregnated overlay paper, pattern paper and several impregnated core papers were put one upon another and pressed into a decorative laminate of simplified type at 130° C. and 20 kg./cm.² for 20 minutes with no subsequent cooling.

EXAMPLE 5

A sheet of special printed paper was sandwiched between two sheets of impregnated overlay paper prepared in the same manner as in Example 1, and the sandwich was placed over a plywood the layers of which were not yet pressed but loosely contacted with each other. Then, the whole combination was pressed together at 100° C. and 5–7 kg./cm.² for 30 minutes. An entirely new decorative plywood having a curved figure was thus obtained.

I claim:

1. A method of making a decorative laminate, which comprises impregnating at least one paper with a modified thermosetting resin at a pH of 7 to 11 and pressing the impregnated paper against a substrate at a temperature of 100° to 200° C. and a pressure of 5 to 20 kg./cm.², the modified thermosetting resin having been prepared by forming a blend consisting essentially of furfuryl alcohol and an aminotriazine-aldehyde resin while said aminotriazine-aldehyde resin is at a pH of 8 to 10 and then adding a latent curing agent to the resulting mixture to give a pH of 7 to 11.

2. A method according to claim 1, wherein the modified thermosetting resin contains the furfuryl alcohol and latent curing agent in amounts of 15–50% and 1–5% by weight of the aminotriazine aldehyde resin, respectively.

3. A method according to claim 1, wherein the aminotriazine aldehyde resin is a resin prepared by the polycondensation of formalin and at least one compound selected from the group consisting of melamine and guanamines.

4. A method according to claim 1, wherein said paper comprises an overlay paper and said substrate comprises a pattern paper and at least one core paper.

5. A method according to claim 1, wherein said substrate is plywood.

References Cited

UNITED STATES PATENTS

| | | | |
|---|---|---|---|
| 2,448,338 | 8/1948 | Widmer et al. | 260—21 |
| 2,481,155 | 9/1949 | Schaefer | 260—67.6 |
| 2,524,727 | 10/1950 | Dudley | 260—67.7 |
| 3,082,180 | 3/1963 | Boldizar et al. | 260—17.3 |
| 3,131,116 | 4/1964 | Pounds | 161—258 |
| 3,294,619 | 12/1966 | Noland | 161—165 |

JOHN T. GOOLKASIAN, Primary Examiner

W. E. HOAG, Assistant Examiner

U.S. Cl. X.R.

161—263, 413; 260—33.4, 67.7, 67.6